United States Patent
Gerber et al.

(10) Patent No.: US 9,990,328 B2
(45) Date of Patent: Jun. 5, 2018

(54) INCREASED DATA FLOW IN UNIVERSAL SERIAL BUS (USB) CABLES

(71) Applicant: QUALCOMM Incorporated, San Diego, CA (US)

(72) Inventors: Nir Gerber, Haifa (IL); Itamar Berman, Kerem Maharal (IL); Yair Shmuel Cassuto, Haifa (IL); Terrence Brian Remple, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 161 days.

(21) Appl. No.: 14/959,006

(22) Filed: Dec. 4, 2015

(65) Prior Publication Data

US 2017/0161226 A1    Jun. 8, 2017

(51) Int. Cl.
G06F 13/20    (2006.01)
G06F 13/42    (2006.01)
G06F 13/38    (2006.01)

(52) U.S. Cl.
CPC ........ G06F 13/4282 (2013.01); G06F 13/382 (2013.01); G06F 13/385 (2013.01)

(58) Field of Classification Search
CPC ... G06F 13/4282; G06F 13/382; G06F 13/385
See application file for complete search history.

(56) References Cited

U.S. PATENT DOCUMENTS

2013/0217274 A1    8/2013  Bar-Niv et al.
2014/0095578 A1*   4/2014  Rajendran ............. G06F 9/5044
                                                       709/203
2014/0329416 A1*  11/2014  Golko ..................... H01R 29/00
                                                       439/676
2015/0137861 A1    5/2015  Cornelius et al.
2015/0261714 A1    9/2015  Talmola
2016/0110305 A1*   4/2016  Hundal ............... G06F 13/4022
                                                       710/316
2016/0112711 A1*   4/2016  Hundal ............... G06F 13/4282
                                                       375/240.26
2016/0217093 A1*   7/2016  Whittington .......... H04L 12/462
(Continued)

OTHER PUBLICATIONS

"Thunderbolt 3 embraces USB Type-C connector, doubles bandwidth to 40Gbps" by Sebastian Anthony, Feb. 6, 2015, downloaded from https://arstechnica.co.uk/gadgets/2015/06/thunderbolt-3-embraces-usb-type-c-connector-doubles-bandwidth-to-40gbps/.*

(Continued)

Primary Examiner — Jing-Yih Shyu
(74) Attorney, Agent, or Firm — Withrow & Terranova, PLLC

(57) ABSTRACT

Two super-speed lanes may be enabled on a single USB cable. In an exemplary, non-limiting aspect, the USB cable is a Type-C cable. In further non-limiting aspects, the super-speed lanes may be present even if there is no USB 2.0 lane present on the D+/D– pins of the USB cable. Use of the second super-speed lane increases data throughput. Eliminating the requirement that the D+/D– pins be used for USB 2.0 data allows greater flexibility in the use of the USB connection because audio or video data may be sent over the D+/D– pins instead of USB 2.0 data. Further, the use of the two super-speed lanes allows a single computing element to operate as a host on one lane and a device on a second lane.

19 Claims, 13 Drawing Sheets

(56) References Cited

U.S. PATENT DOCUMENTS

2017/0109312 A1    4/2017    Voor et al.
2017/0124016 A1*   5/2017    Gerber ................ G06F 13/4282

OTHER PUBLICATIONS

"How to Create and Program USB Devices" by Henk Muller, XMOS, Jul. 27, 2012, downloaded from http://www.electronicdesign.com/boards/how-create-and-program-usb-devices.*
Cunningham, Andrew, "USB 3.1 and Type-C: The only stuff at CES that everyone is going to use," Ars Technica, Jan. 8, 2015, 6 pages, http://arstechnica.com/gadgets/2015/01/usb-3-1-and-type-c-the-only-stuff-at-ces-that-everyone-is-going-to-use/.
Author Unknown, "VESA® Brings DisplayPort™ to New USB Type-C Connector," VESA, Sep. 22, 2014, 4 pages, http://www.vesa.org/news/vesa-brings-displayport-to-new-usb-type-c-connector/.
Author Unknown, "Universal Serial Bus Type-C Cable and Connector Specification," USB 3.0 Promoter Group, Revision 1.1, Apr. 3, 2015, 180 pages.
International Search Report and Written Opinion for PCT/US2016/060543, dated Feb. 10, 2017, 11 pages.
International Preliminary Report on Patentability for PCT/US2016/060543, dated Dec. 1, 2017, 15 pages.

* cited by examiner

| A1 | A2 | A3 | A4 | A5 | A6 | A7 | A8 | A9 | A10 | A11 | A12 |
|---|---|---|---|---|---|---|---|---|---|---|---|
| GND | TX1+ | TX1− | VBUS | CC | D+ | D− | SBU1 | VBUS | RX2− | RX2+ | GND |
| GND | RX1+ | RX1− | VBUS | SBU2 | | | VCONN | VBUS | TX2− | TX2+ | GND |
| B12 | B11 | B10 | B9 | B8 | B7 | B6 | B5 | B4 | B3 | B2 | B1 |

FIG. 1A

| A1 | A2 | A3 | A4 | A5 | A6 | A7 | A8 | A9 | A10 | A11 | A12 |
|---|---|---|---|---|---|---|---|---|---|---|---|
| GND | TX1+ | TX1− | VBUS | CC1 | D+ | D− | SBU1 | VBUS | RX2− | RX2+ | GND |
| GND | RX1+ | RX1− | VBUS | SBU2 | D− | D+ | CC2 | VBUS | TX2− | TX2+ | GND |
| B12 | B11 | B10 | B9 | B8 | B7 | B6 | B5 | B4 | B3 | B2 | B1 |

FIG. 1B

INCREASED DATA FLOW IN UNIVERSAL SERIAL BUS (USB) CABLES

BACKGROUND

I. Field of the Disclosure

The technology of the disclosure relates generally to increasing data rates on Universal Serial Bus (USB) cables.

II. Background

Computing devices are increasingly common in modern society. Increased functionality allows greater flexibility of use for any given computing device. However, even multi-function devices need to communicate (or may at least benefit from communication) with other computing devices. Various techniques have evolved to allow such inter-device communication. While wireless techniques are increasingly popular, several wire-based techniques centered around a cable remain popular.

One such cable-based technique is embodied in the Universal Serial Bus (USB) protocol. Various flavors of USB have emerged to allow data transfer and/or power transfer between devices, including USB 1.0 (now largely defunct), USB 2.0, USB 3.0, and USB 3.1. Within the various flavors of USB, a number of different types of plugs have also been promulgated throughout the industry, including Type-A and Type-B. Further types of connectors also exist such as Micro-A, Micro-B, Micro-AB, and Mini-B. More recently, USB promoters have set forth a USB Type-C cable and connector. Unlike prior iterations of the USB connector, the Type-C connector includes two rows of conductors such that the connector may be inserted right side up or right side down and still function. Additionally, the top and bottom rows of conductors are mirror images of one another such that regardless of orientation, the connector is backwards compatible with earlier generations of USB receptacles.

While the USB Type-C cable and connector represent an advance in user friendliness and allow for both a super-speed lane and a normal high-speed lane to be concurrently operational over the cable, there is still a need for faster data transfer over USB connections.

SUMMARY OF THE DISCLOSURE

Aspects disclosed in the detailed description provide increased data flow in Universal Serial Bus (USB) cables. In particular, exemplary aspects of the present disclosure provide techniques through which two super-speed lanes may be enabled on a single USB cable. In an exemplary, non-limiting aspect, the USB cable is a Type-C cable. In further non-limiting aspects, the super-speed lanes may be present even if there is no USB 2.0 lane present on the D+/D– pins of the USB cable. Use of the second super-speed lane increases data throughput. Eliminating the requirement that the D+/D– pins be used for USB 2.0 data allows greater flexibility in the use of the USB connection because audio or video data may be sent over the D+/D– pins instead of USB 2.0 data. Further, the use of the two super-speed lanes allows a single computing element to operate as a host on one lane and a device on a second lane. Such bifurcated designation may be of assistance in a debug operation or the like.

In this regard in one aspect, an element is disclosed. The element includes a USB cable receptacle. The USB cable receptacle includes a first set of pins and a second set of pins. The element also includes a controller. The controller is configured to put a first USB super-speed signal on the first set of pins in the USB cable receptacle. The controller is also configured to put a second USB super-speed signal on the second set of pins in the USB cable receptacle.

In another aspect, a method of coupling two computing elements together is disclosed. The method includes detecting insertion of a USB plug into a USB receptacle at a first computing element. The method also includes initiating a capability inquiry over a USB cable associated with the USB plug. The method also includes, if a response is received indicating that a second computing element is capable of supporting two super-speed lanes over the USB cable, communicating between the first computing element and the second computing element using the two super-speed lanes.

In another aspect, a computing system is disclosed. The computing system includes a first element including a first USB receptacle. The computing system also includes a second element including a second USB receptacle. The computing system also includes a USB cable coupled at a first end to the first USB receptacle and coupled to the second USB receptacle at a second end. The first element is configured to communicate with the second element using two super-speed lanes over the USB cable.

BRIEF DESCRIPTION OF THE FIGURES

FIG. 1A is a block diagram of an exemplary conventional Universal Serial Bus (USB) Type-C connector pin assignment;

FIG. 1B is a block diagram of an exemplary conventional USB Type-C receptacle pin assignment;

DETAILED DESCRIPTION

Figure 2:
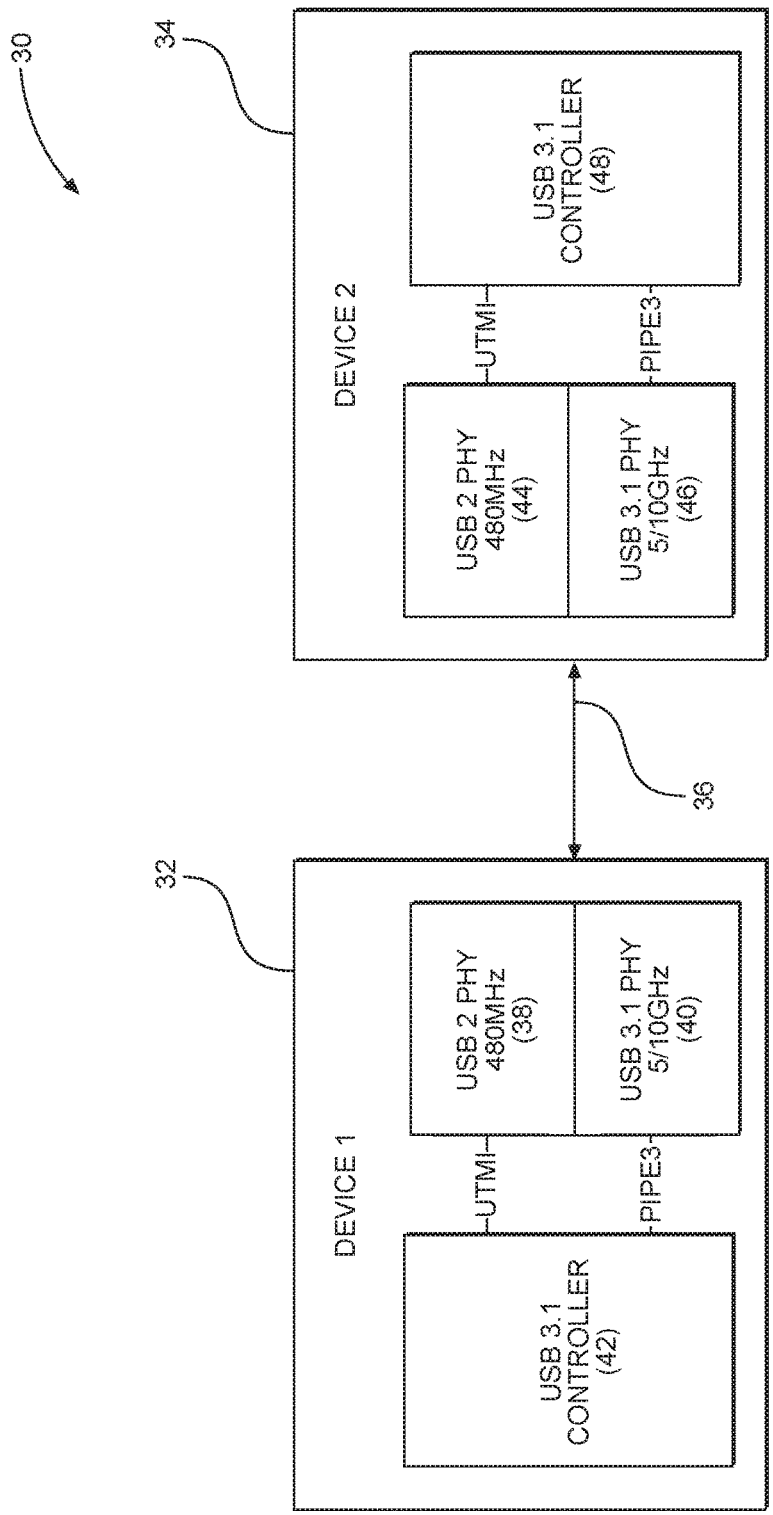
FIG. 2 is a simplified block diagram of a conventional USB Type-C system with a USB 2.0 lane and a single super-speed lane.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description provide increased data flow in Universal Serial Bus (USB) cables. In particular, exemplary aspects of the present disclosure provide techniques through which two super-speed lanes may be enabled on a single USB cable. In an exemplary, non-limiting aspect, the USB cable is a Type-C cable. In further non-limiting aspects, the super-speed lanes may be present even if there is no USB 2.0 lane present on the D+/D− pins of the USB cable. Use of the second super-speed lane increases data throughput. Eliminating the requirement that the D+/D− pins be used for USB 2.0 data allows greater flexibility in the use of the USB connection because audio or video data may be sent over the D+/D− pins instead of USB 2.0 data. Further, the use of the two super-speed lanes allows a single computing element to operate as a host on one lane and a device on a second lane. Such bifurcated designation may be of assistance in a debug operation or the like.

In this regard, FIG. 1A illustrates a conventional USB Type-C connector 10 (sometimes referred to as a plug). The USB Type-C connector 10 includes a top row of conductive pins 12 and a bottom row of conductive pins 14. The top row of conductive pins 12 and the bottom row of conductive pins 14 are mirror images of each other such that the USB Type-C connector 10 may be inserted in either orientation and still mate with corresponding conductive pins in a USB receptacle 20, illustrated in FIG. 1B as is well understood. The USB receptacle 20 also includes a top row of conductive pins 22 and a bottom row of conductive pins 24. Table 1, reproduced below, explains the pinout for the USB Type-C connector 10 and the USB receptacle 20.

TABLE 1

USB Type-C connector pinouts

| Pin | Name | Description |
| --- | --- | --- |
| A1 | GND | Ground return |
| A2 | TX1+ | SS differential pair #1 TX positive |
| A3 | TX1− | SS differential pair #1 TX negative |
| A4 | VBUS | Bus power |
| A5 | CC1 | Configuration channel |
| A6 | D+ | USB 2.0 differential pair, positive |
| A7 | D− | USB 2.0 differential pair, negative |
| A8 | SBU1 | Sideband use |
| A9 | VBUS | Bus power |
| A10 | RX2− | SS differential pair #2, RX negative |
| A11 | RX2+ | SS differential pair #2, RX positive |
| A12 | GND | Ground return |
| B12 | GND | Ground return |

TABLE 1-continued

USB Type-C connector pinouts

| Pin | Name | Description |
| --- | --- | --- |
| B11 | RX1+ | SS differential pair #1, RX positive |
| B10 | RX1− | SS differential pair #1, RX negative |
| B9 | VBUS | Bus power |
| B8 | SBU2 | Sideband use |
| B7 | D− | USB differential pair, negative |
| B6 | D+ | USB differential pair, positive |
| B5 | CC2 | Configuration Channel |
| B4 | VBUS | Bus power |
| B3 | TX2− | SS differential pair #2, TX negative |
| B2 | TX2+ | SS differential pair #2, TX positive |
| B1 | GND | Ground return |

A conventional USB Type-C system 30 is illustrated in FIG. 2. The USB Type-C system 30 includes a first element 32 and a second element 34 coupled by a USB Type-C cable 36. It should be appreciated that the elements 32 and 34 may be computing elements such as a mobile terminal, desktop computer, camera, display, printer, scanner, mouse, stylus, or the like. The first element 32 includes a USB 2.0 physical layer (PHY) 38 and a super-speed PHY 40 under the control of a controller 42. The second element 34 includes a USB 2.0 PHY 44 and a super-speed PHY 46 under the control of a controller 48. In normal operation, according to the current USB standard, the USB Type-C system 30 only uses one differential pair for super-speed communication at a time and requires the presence of a USB 2.0 signal on the D+/D− pins. That is, either A2, A3, B10, and B11 are used or A10, A11, B2, and B3 are used (or, if a Type-C connector has been plugged into a legacy receptacle, either A2, A3, A10, and A11 or B2, B3, B10, and B11 are used).

Exemplary aspects of the present disclosure allow both sets of super-speed lanes to be used for super-speed communication concurrently. Using the two super-speed lanes increases the data throughput of the USB Type-C cable. Additionally, exemplary aspects of the present disclosure allow the super-speed lanes to be operational in the absence of a USB 2.0 signal on the D+/D− pins of the connector 10 and the receptacle 20. By removing the requirement for the D+/D− pins to carry USB 2.0 data, the pins so freed may now carry any other data, such as video or audio data, according to a different protocol. Further, by having two super-speed lanes available, each element may be a host and a device, which may be useful in debug situations. Still other advantages are possible as explained below.

Figure 3:
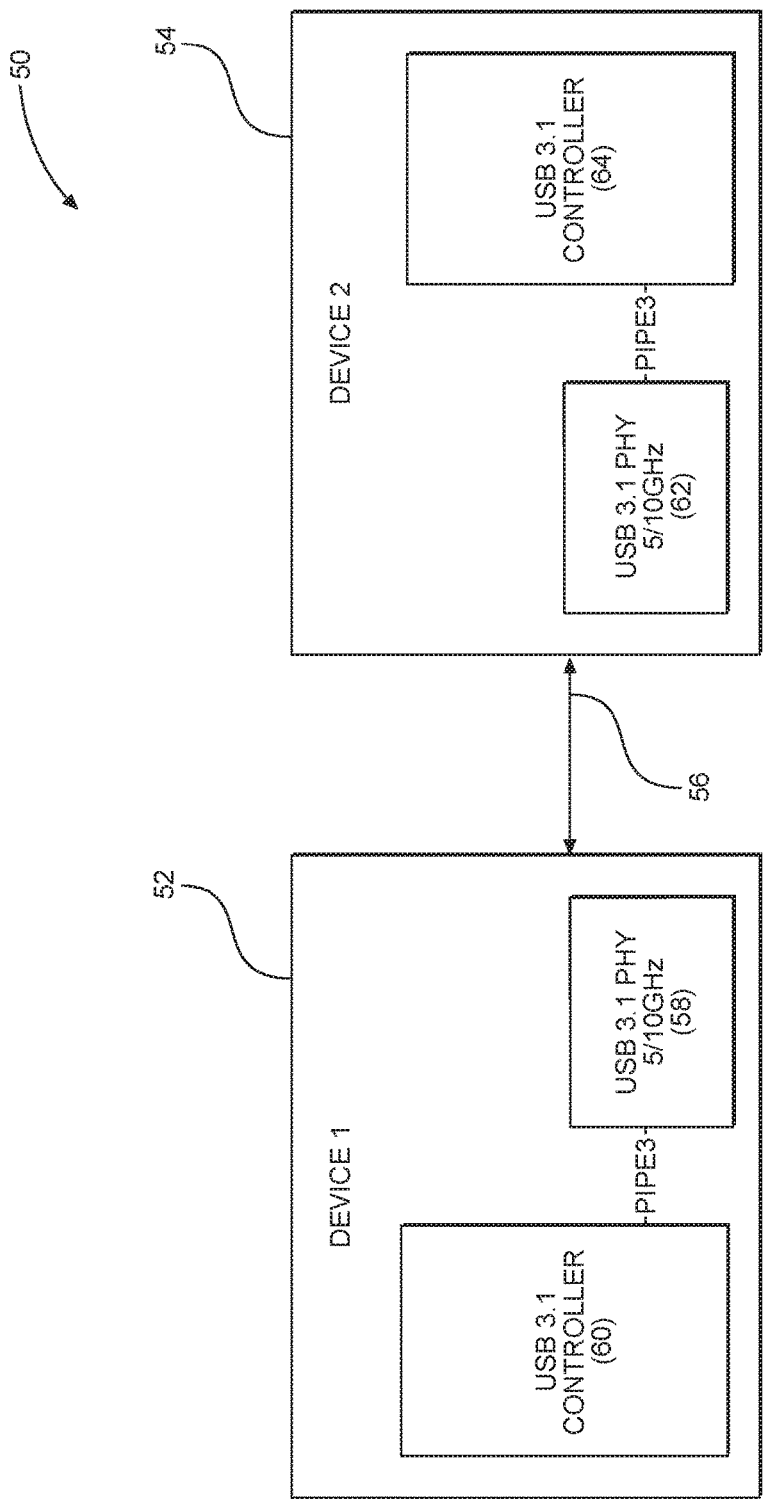
FIG. 3 is a simplified block diagram of a USB Type-C system where the USB 2.0 lane has been eliminated according to an exemplary aspect of the present disclosure.

In this regard, FIG. 3 illustrates an exemplary USB system 50 according to exemplary aspects of the present disclosure. In particular, the USB system 50 includes a first computing element 52 and a second computing element 54 coupled by a USB Type-C cable 56. The first computing element 52 includes a USB 3.1 PHY 58 and a controller 60. The second computing element 54 includes a USB 3.1 PHY 62 and a controller 64. The first computing element 52 communicates with the second computing element 54 using only a super-speed data lane over the USB Type-C cable 56 with no USB 2.0 signal required. As explained below with reference to FIG. 12, a capability inquiry is made from the first computing element 52 to the second computing element 54 to which the second computing element 54 responds indicating that the second computing element 54 is configured to operate without a USB 2.0 lane. Subsequent USB-compliant communication occurs over the super-speed lane.

Figure 4:
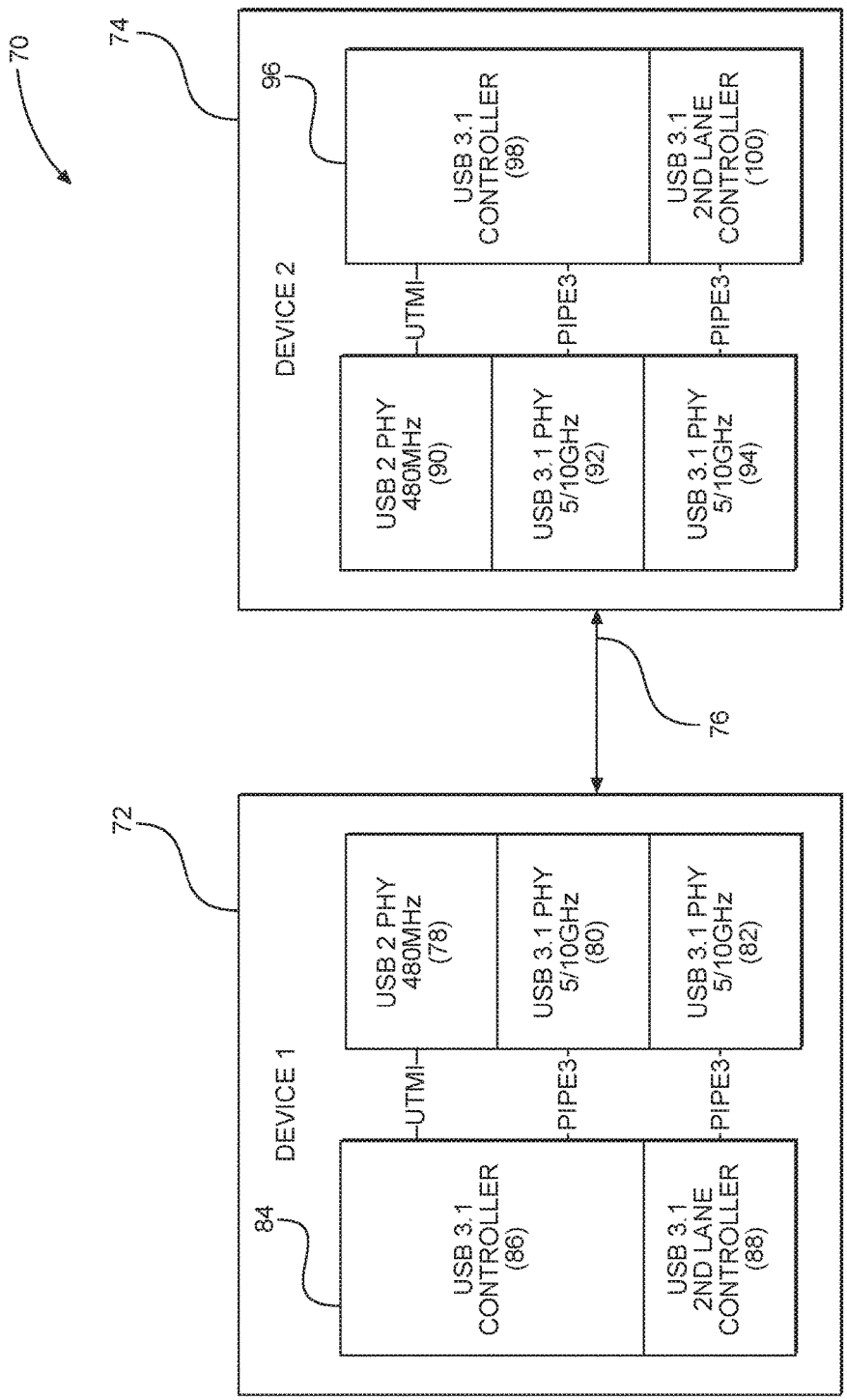
FIG. 4 is a simplified block diagram of a USB Type-C system where the USB 2.0 lane is present in association with two super-speed lanes according to an exemplary aspect of the present disclosure.

While eliminating the need to have a USB 2.0 signal frees the D+/D− pins for reuse with another protocol (examples of which are illustrated below with reference to FIGS. 5 and 6), dramatically improved bandwidth is achieved by allowing a second super-speed lane to operate concurrently with the first super-speed lane. In this regard, FIG. 4 illustrates a USB system 70 including a first computing element 72 and a second computing element 74 coupled by a USB Type-C cable 76. The first computing element 72 includes a USB 2.0 PHY 78, a first super-speed PHY 80, and a second super-speed PHY 82. The first computing element 72 also includes a controller 84. The controller 84 may include a first sub-controller 86 and a second sub-controller 88. The first sub-controller 86 is configured to handle USB 2.0 signaling and super-speed signaling and may control the USB 2.0 PHY 78 and the first super-speed PHY 80 or the second super-speed PHY 82. The second sub-controller 88 is configured to handle super-speed signaling and may control the first super-speed PHY 80 or the second super-speed PHY 82.

With continued reference to FIG. 4, the second computing element 74 includes a USB 2.0 PHY 90, a first super-speed PHY 92, and a second super-speed PHY 94. The second computing element 74 also includes a controller 96. The controller 96 may include a first sub-controller 98 and a second sub-controller 100. The first sub-controller 98 is configured to handle USB 2.0 signaling and super-speed signaling and may control the USB 2.0 PHY 90 and the first super-speed PHY 92 or the second super-speed PHY 94. The second sub-controller 100 is configured to handle super-speed signaling and may control the first super-speed PHY 92 or the second super-speed PHY 94.

With continued reference to FIG. 4 and Table 1, a first super-speed lane between the first super-speed PHY 80 and the first super-speed PHY 92 may use pins A2, A3, B10, and B11. A second super-speed lane between the second super-speed PHY 82 and the second super-speed PHY 94 may use pins A10, A11, B2, and B3. As noted above, the use of the two super-speed lanes effectively increases the bandwidth available for communication between the first computing element 72 and the second computing element 74. It should be appreciated that generation one of USB 3.1 supports normal bandwidths of 5 Gbps and generation two of USB 3.1 supports normal bandwidths of 10 Gbps. Exemplary aspects of the present disclosure double these rates to 10 Gbps and 20 Gbps, respectively.

Figure 5:
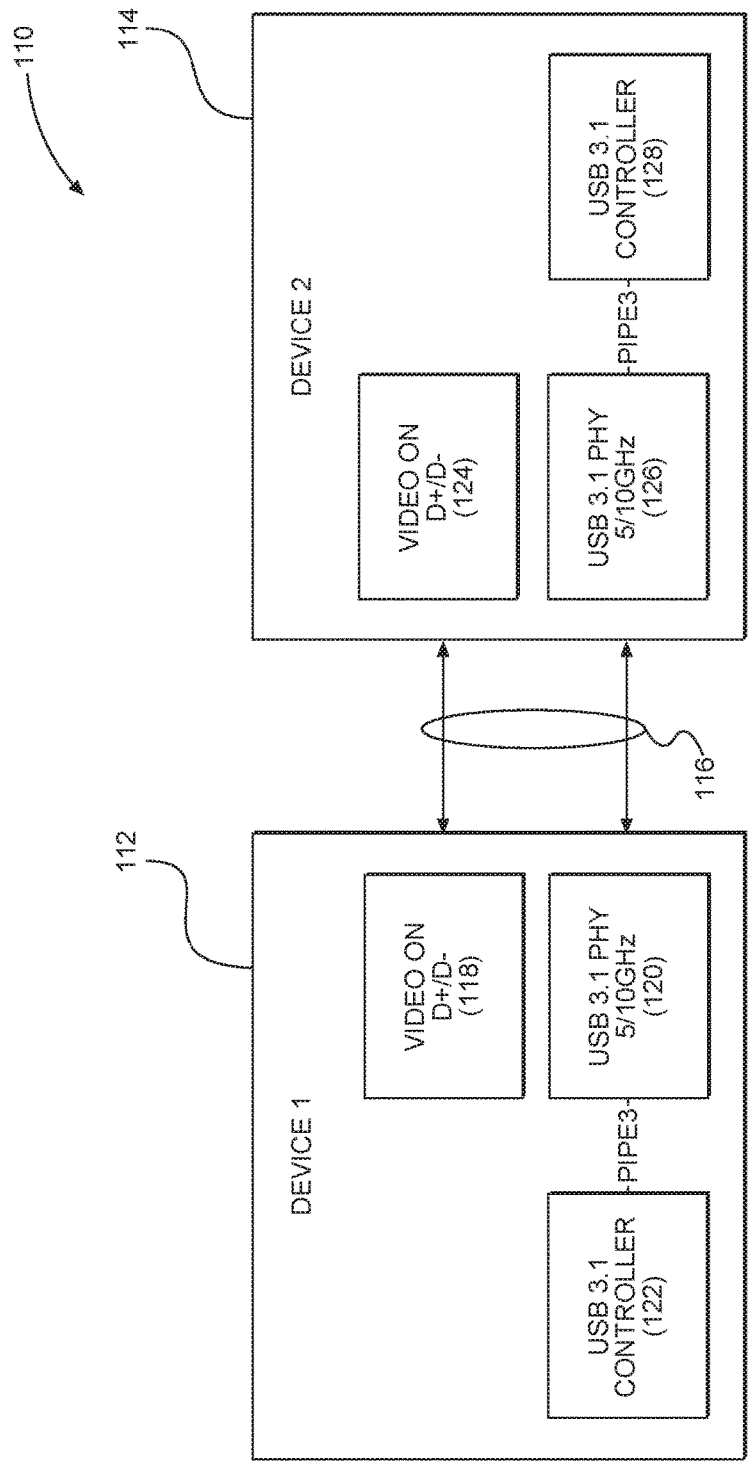
FIG. 5 is a simplified block diagram of a USB Type-C system with a video signal on the D+/D– pins and a single super-speed lane according to an exemplary aspect of the present disclosure.
Figure 6:
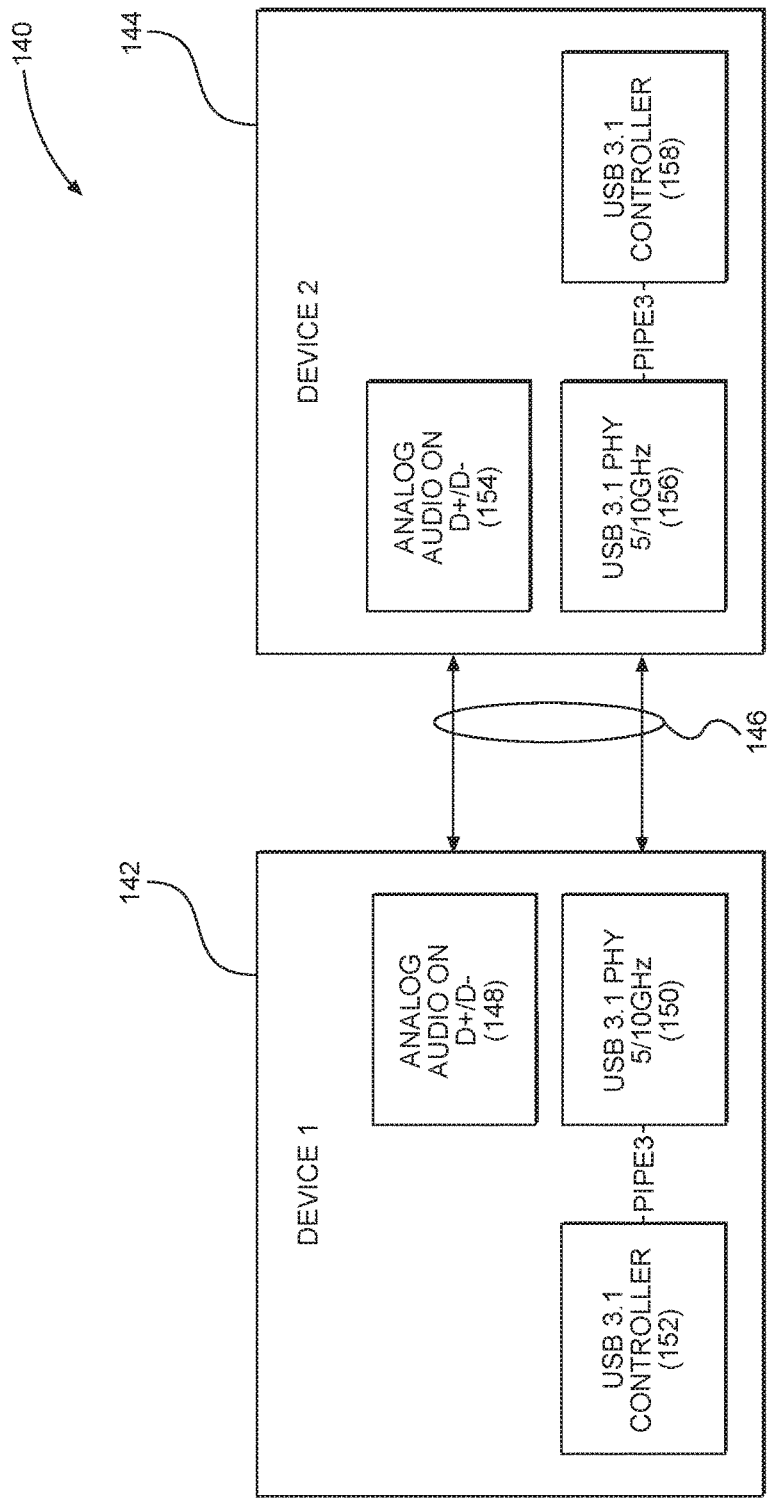
FIG. 6 is a simplified block diagram of a USB Type-C system with an audio signal on the D+/D– pins and a single super-speed lane according to an exemplary aspect of the present disclosure.

Even where the two super-speed lanes are not used, the elimination of the requirement that a USB 3.1 lane be coupled to a USB 2.0 lane allows for reuse of the D+/D− pins for another signal. In this regard, FIGS. 5 and 6 illustrate two exemplary reuse scenarios. Specifically, FIG. 5 illustrates a USB system 110 configured to send a video signal on the D+/D− pins and FIG. 6 illustrates a USB system 140 configured to send an audio signal on the D+/D− pins.

With reference to FIG. 5, the USB system 110 includes a first computing element 112 and a second computing element 114 coupled by a USB Type-C cable 116. The first computing element 112 includes a video PHY 118 and a super-speed PHY 120. The first computing element 112 also includes a controller 122. The second computing element 114 includes a video PHY 124 and a super-speed PHY 126. The second computing element 114 also includes a controller 128. Video signals may be sent over the D+/D− pins. The super-speed lane may be sent over the A2, A3, B10, and B11 pins or over the A10, A11, B2, and B3 pins. Note that while not illustrated, the two super-speed lanes and a video lane may be present in the USB system 110, in which case the two super-speed lanes may use both TX1/RX1 as well as TX2/RX2 lanes.

Similarly, with reference to FIG. 6, the USB system 140 includes a first computing element 142 and a second computing element 144 coupled by a USB Type-C cable 146. The first computing element 142 includes an audio PHY 148 and a super-speed PHY 150. The first computing element 142 also includes a controller 152. The second computing element 144 includes an audio PHY 154 and a super-speed PHY 156. The second computing element 144 also includes a controller 158. Audio signals such as mobile high definition link (MHL) may be sent over the D+/D− pins. The super-speed lane may be sent over the A2, A3, B10, and B11 pins or over the A10, A11, B2, and B3 pins. Note that while not illustrated, the two super-speed lanes and an audio lane may be present in the USB system 140, in which case the two super-speed lanes may use both TX1/RX1 as well as TX2/RX2 lanes.

Figure 7:
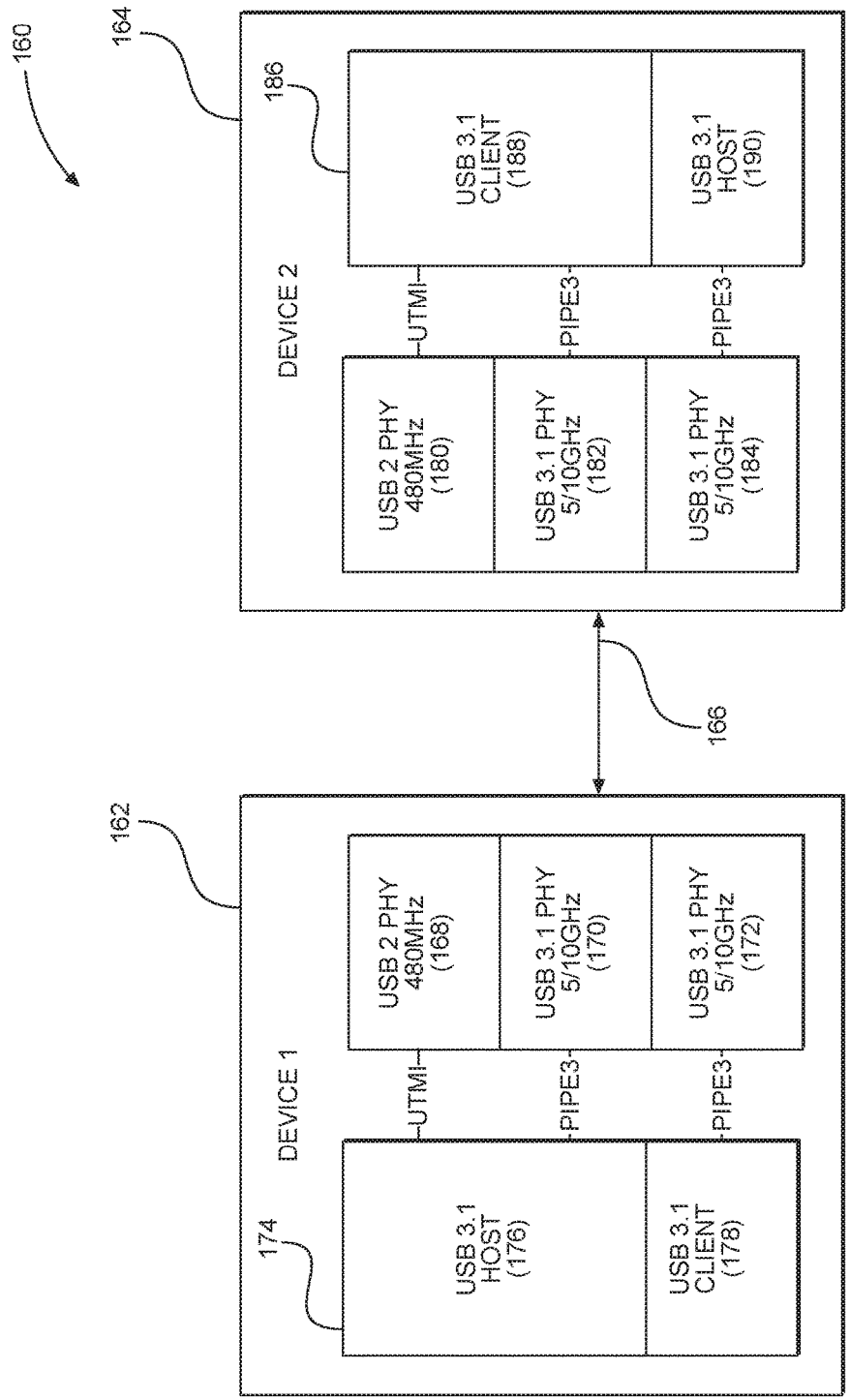
FIG. 7 is a simplified block diagram of a USB Type-C system with a host in both computing elements within the system according to an exemplary aspect of the present disclosure.

While the aspects of FIGS. 3-6 provide flexibility as well as increased speed, further flexibility may be achieved. In an exemplary aspect, both computing elements may operate as a host on a first super-speed lane and a device on a second super-speed lane. Such arrangement may be useful in debug operations or other situations where two hosts need to communicate. In this regard, FIG. 7 illustrates USB system 160, which includes a first computing element 162 and a second computing element 164 coupled by a USB Type-C cable 166. The first computing element 162 includes a USB 2.0 PHY 168, a first super-speed PHY 170, and a second super-speed PHY 172. The first computing element 162 also includes a controller 174. The controller 174 includes a first sub-controller 176, which may be a host controller, and a second sub-controller 178, which may be a client controller.

Similarly, with continued reference to FIG. 7, the second computing element 164 includes a USB 2.0 PHY 180, a first super-speed PHY 182, and a second super-speed PHY 184. The second computing element 164 also includes a controller 186. The controller 186 includes a first sub-controller 188, which may be a client controller, and a second sub-controller 190, which may be a host controller. The first sub-controller 176 may cause the first computing element 162 to operate as a host relative to the second computing element 164 over a first super-speed lane (e.g., TX1/RX1), and the first sub-controller 188 may cause the second computing element 164 to operate as a client relative to the first computing element 162 over the first super-speed lane. The second sub-controller 178 may cause the first computing element 162 to operate as a client relative to the second computing element 164 over a second super-speed lane (e.g., TX2/RX2), and the second sub-controller 190 may cause the second computing element 164 to operate as a host relative to the first computing element 162 over the second super-speed lane.

Figure 8:
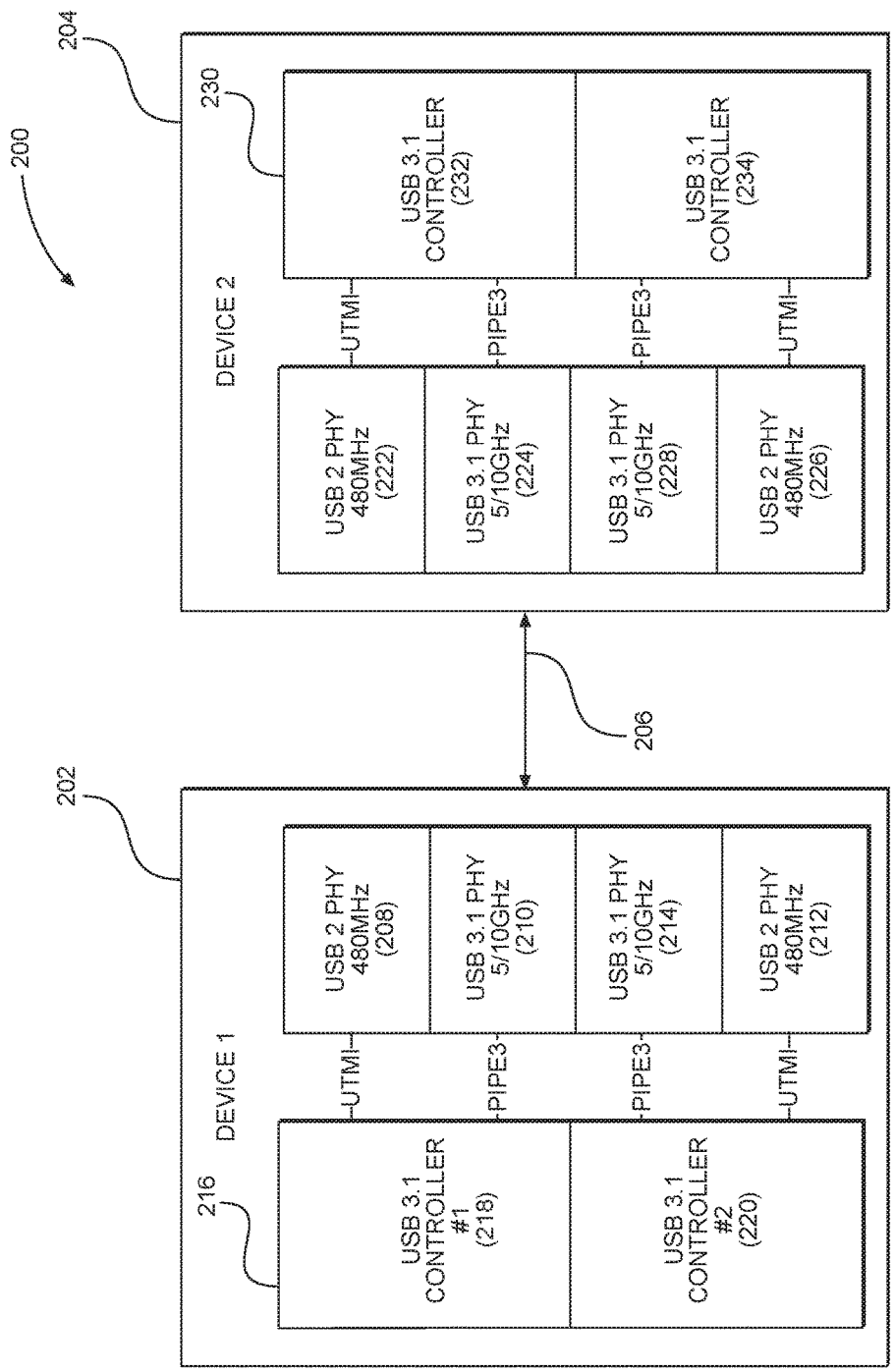
FIG. 8 is a simplified block diagram of a USB Type-C system with a modified cable that supports an additional USB 2.0 lane with two super-speed lanes according to an exemplary aspect of the present disclosure.

While some exemplary aspects of the present disclosure contemplate elimination of the USB 2.0 lane, the present disclosure is not so limited, and, in fact, each of the two super-speed lanes may have a respective USB 2.0 lane associated therewith as better illustrated in FIG. 8. In particular, FIG. 8 illustrates a USB system 200, which includes a first computing element 202 and a second computing element 204 coupled by a USB Type-C cable 206. The first computing element 202 includes a first USB 2.0 PHY 208 associated with a first super-speed PHY 210. The first computing element 202 may further include a second USB 2.0 PHY 212 and a second super-speed PHY 214. The first USB 2.0 PHY 208 may use the D+/D− pins to form a first USB 2.0 lane, and the first super-speed PHY 210 may use the TX1/RX1 pins to form the first super-speed lane. The second USB 2.0 PHY 212 may use pins A8 and B8 as D+/D− pins to form a second USB 2.0 lane. The second super-speed PHY 214 may use the TX2/RX2 pins to form the second super-speed lane. The first computing element 202 further includes a controller 216 that includes a first sub-controller 218 that controls the first USB 2.0 lane and the first super-speed lane. The controller 216 further includes a second sub-controller 220 that controls the second USB 2.0 lane and the second super-speed lane. As an alternative to the use of pins A8 and B8, the USB Type-C cable 206 may be modified to support a D+/D− lane on pins B6 and B7. In such case (not illustrated), pins A8 and B8 can be used to pass video or audio as described above with reference to FIGS. 5 and 6.

With continued reference to FIG. 8, the second computing element 204 includes a first USB 2.0 PHY 222 associated with a first super-speed PHY 224. The second computing element 204 may further include a second USB 2.0 PHY 226 and a second super-speed PHY 228. The second computing element 204 further includes a controller 230 that includes a first sub-controller 232 that controls the first USB 2.0 lane and the first super-speed lane. The controller 230 further includes a second sub-controller 234 that controls the second USB 2.0 lane and the second super-speed lane.

Figure 9:
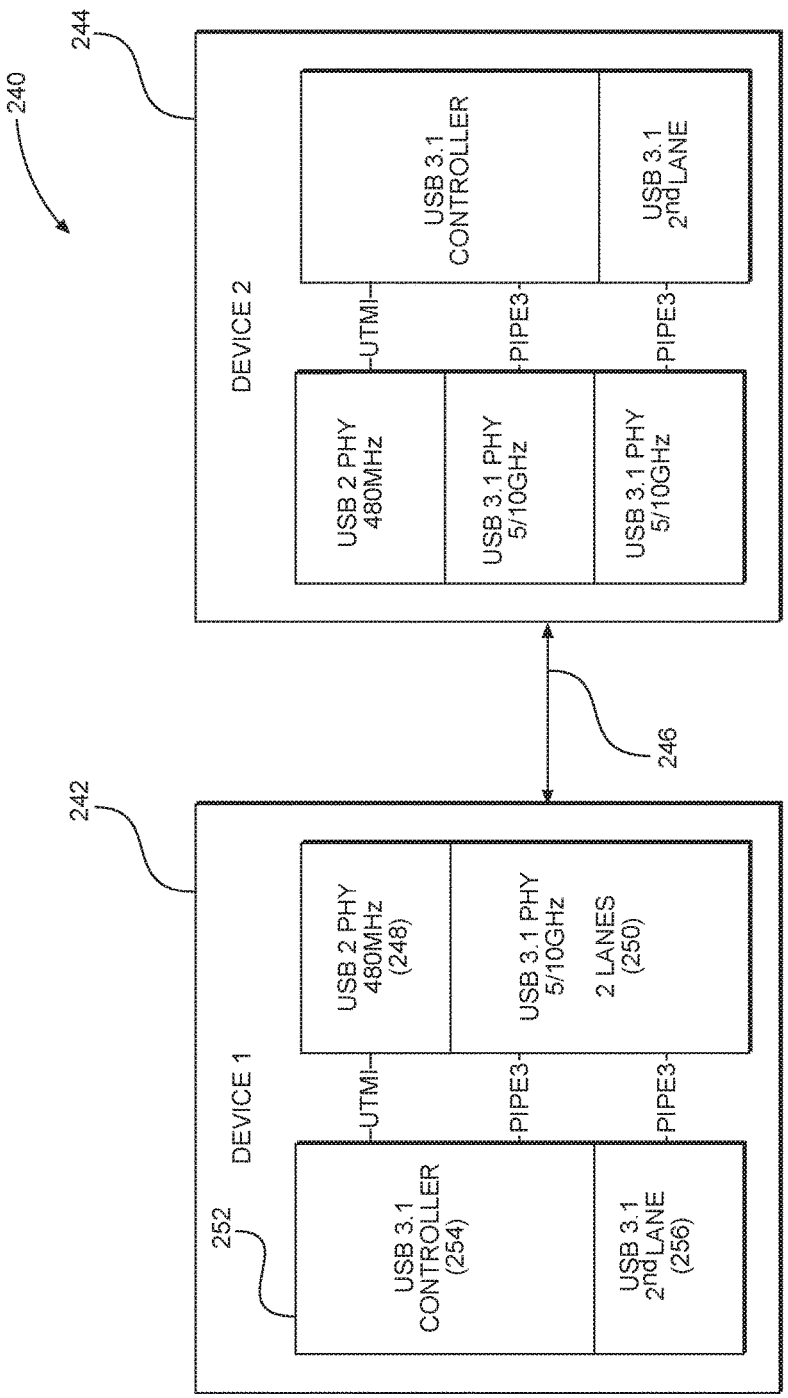
FIG. 9 is a simplified block diagram of a USB Type-C system with a single physical layer and two controllers supporting two super-speed lanes according to an exemplary aspect of the present disclosure.

While the above aspects have contemplated a separate PHY for each super-speed lane, the present disclosure is not so limited. USB system 240, illustrated in FIG. 9, includes a first computing element 242 and a second computing element 244 coupled by a USB Type-C cable 246. The first computing element 242 includes a USB 2.0 PHY 248 and a unitary super-speed PHY 250 that provides the physical layer for two super-speed lanes. The first computing element 242 may further include a controller 252 with a first sub-controller 254 and a second sub-controller 256. The sub-controllers 254 and 256 control different ones of the two super-speed lanes. The second computing element 244, as illustrated, may be substantially similar to the second computing element 74 of FIG. 4. Alternatively, while not illustrated, the second computing element 244 may be constructed with a single super-speed PHY like the first computing element 242. Use of a single PHY in this fashion conserves area within the computing elements and may reduce the need for duplicative power consuming components such as a phase locked loop (PLL).

Figure 10:
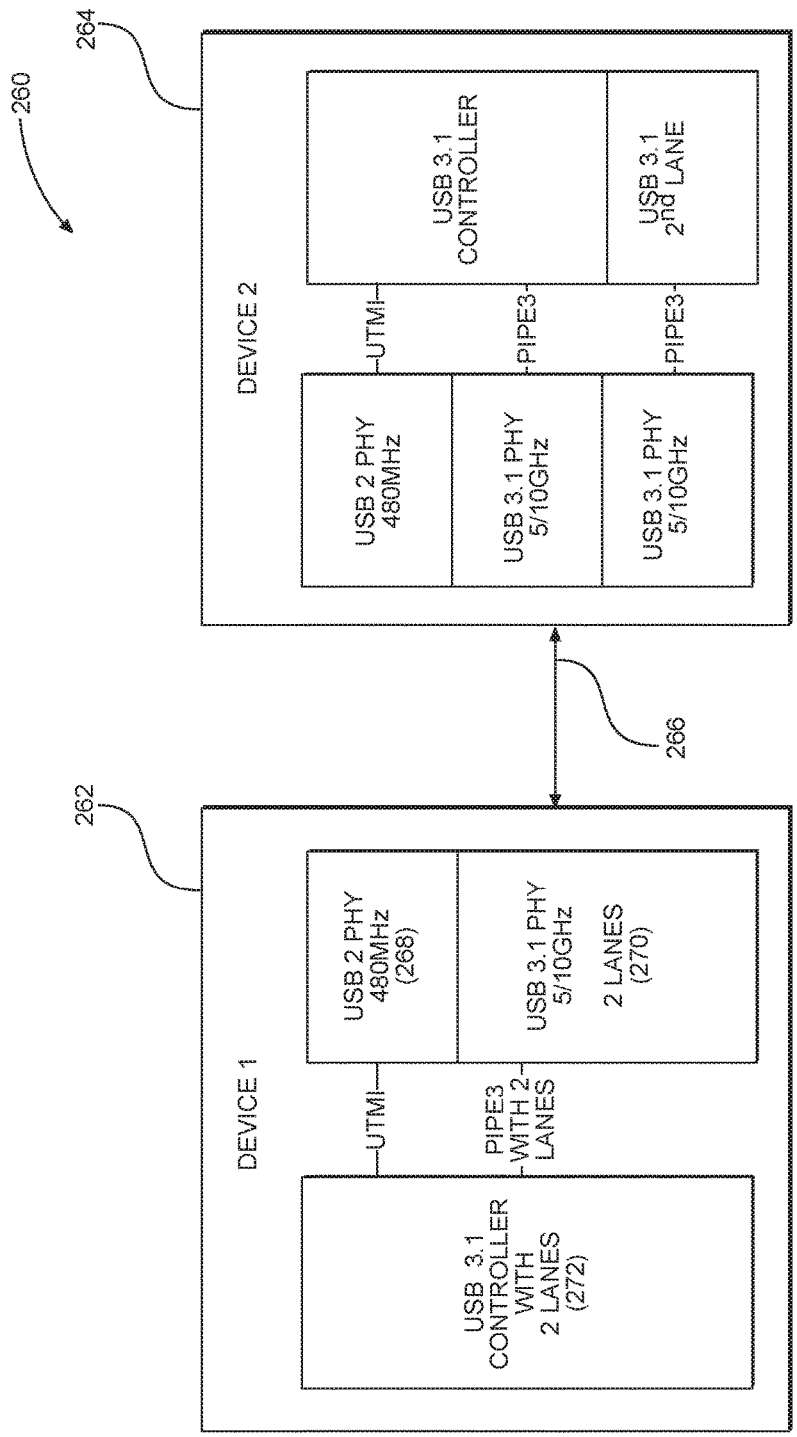
FIG. 10 is simplified block diagram of a USB Type-C system with a single controller and a single physical layer supporting two super-speed lanes according to an exemplary aspect of the present disclosure.

While the above aspects have contemplated separate controllers or sub-controllers for each super-speed lane, the present disclosure is not so limited. USB system 260, illustrated in FIG. 10, includes a first computing element 262 and a second computing element 264 coupled by a USB Type-C cable 266. The first computing element 262 includes a USB 2.0 PHY 268 and a unitary super-speed PHY 270 that provides the physical layer for two super-speed lanes. The first computing element 262 may further include a unitary controller 272 which controls both super-speed lanes. The second computing element 264, as illustrated, may be substantially similar to the second computing element 74 of FIG. 4. Alternatively, while not illustrated, the second computing element 264 may be constructed with a single super-speed PHY like the first computing element 262.

Figure 11:
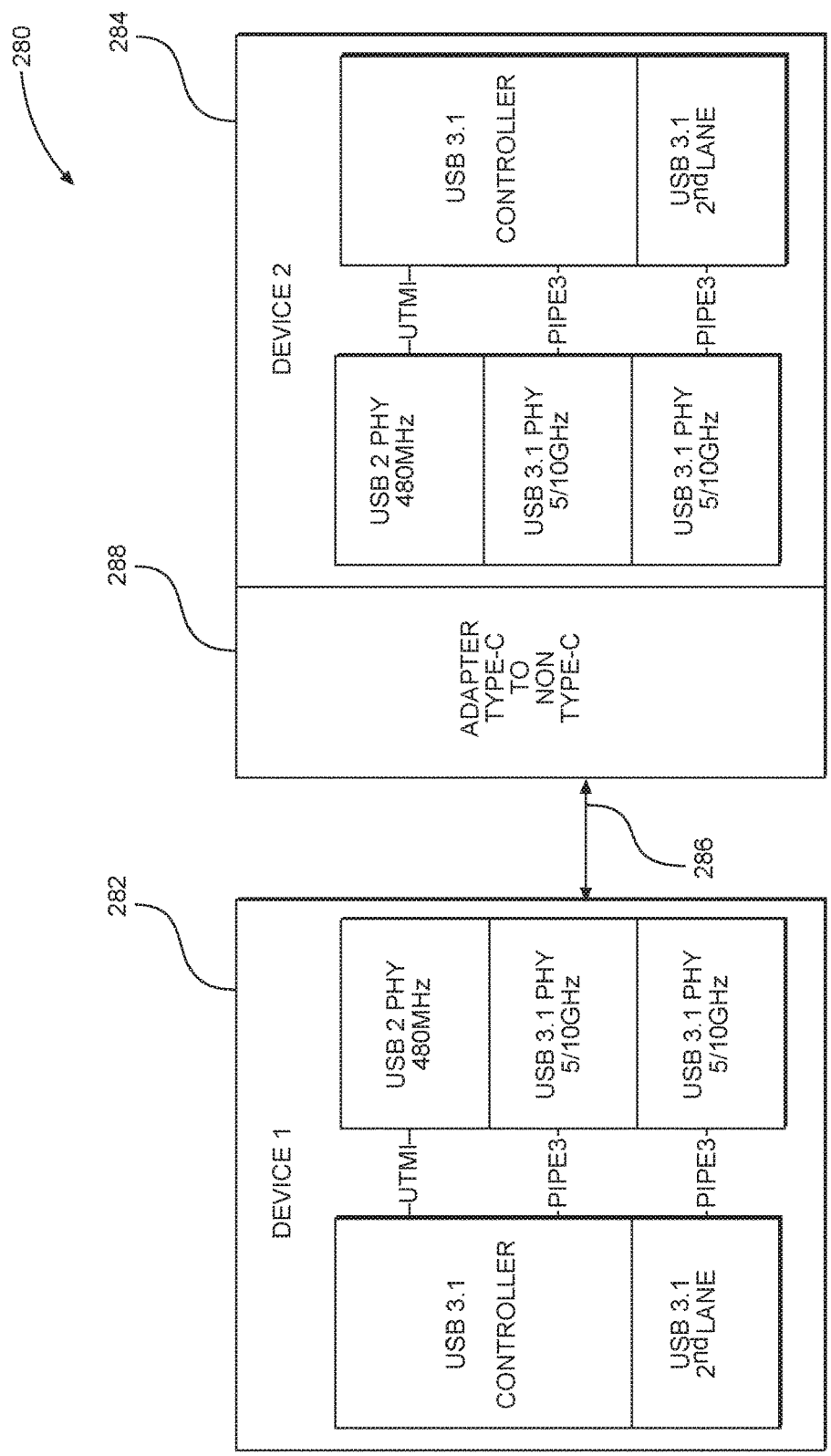
FIG. 11 is a simplified block diagram of a USB Type-C system with a modified cable that supports a Type-C connector on one end and a connector other than a Type-C connector on a remote end according to an exemplary aspect of the present disclosure.

While the above description assumes that both computing elements have a USB Type-C receptacle, the present disclosure is not so limited. In an exemplary aspect, one end of a USB Type-C cable may be a proprietary plug (e.g., APPLE LIGHTNING™) and fit within a complementary receptacle. Alternatively, an adaptor may be used in conjunction with a non-USB receptacle. In this regard, FIG. 11 illustrates USB system 280 with a first computing element 282 and a second computing element 284 coupled by a USB Type-C cable 286 and an adaptor 288. The adaptor 288 converts a USB Type-C pin layout to a non-Type-C pin layout (e.g., USB Type-C to APPLE LIGHTNING™). While the receptacle on the second computing element 284 may not conform to the USB Type-C standard, in other aspects, the first computing element 282 and the second computing element 284 may be similar to other computing elements described herein.

While the present disclosure has focused on USB Type-C cables, it should be appreciated that future evolutions of USB may move to different nomenclature, but preserve the functionality of the USB Type-C format. Accordingly, the present disclosure may be applied to other USB cables.

Figure 12:
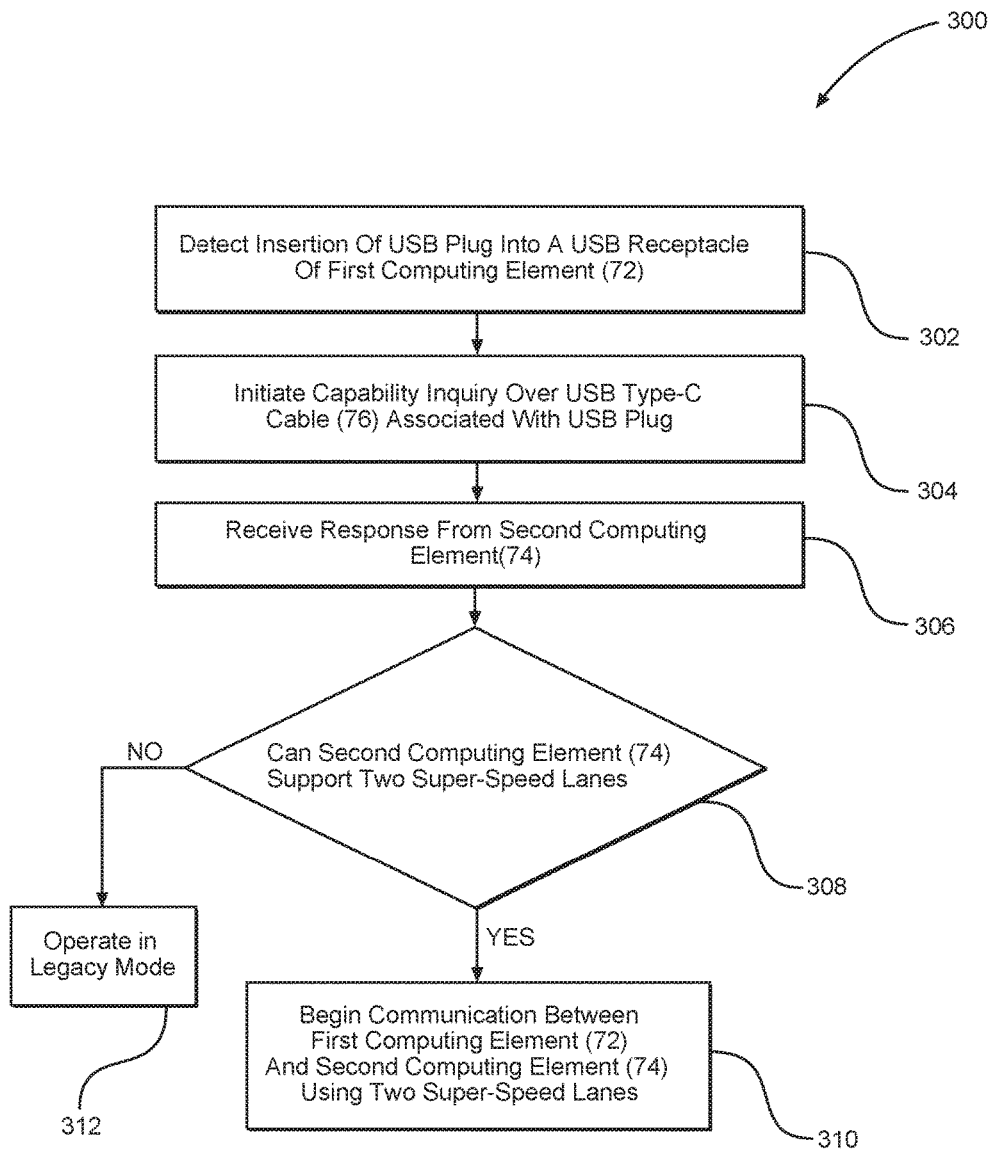
FIG. 12 is a flowchart illustrating an exemplary process for determining whether a remote computing element is capable of using two super-speed lanes and subsequent operation.

The above discussion has focused on the hardware elements that may be present in various configurations with the general assumption that both computing elements are designed to support the two super-speed lanes of the present disclosure. However, the present disclosure contemplates backwards compatibility with legacy devices. In this regard, FIG. 12 illustrates a flowchart of a process 300. The process 300 begins by detecting insertion of a USB plug into a USB receptacle at the first computing element 72 of FIG. 4 (block 302). The first computing element 72, and particularly the controller 84, initiates a capability inquiry over the USB Type-C cable 76 associated with the USB plug (block 304). The first computing element 72 receives a response from the second computing element 74. Based on the response, the controller 84 determines if the second computing element 74 can support two super-speed lanes (block 308). If the response indicates that the second computing element 74 is capable of supporting two super-speed lanes over the USB Type-C cable 76, the first computing element 72 begins communicating between the first computing element 72 and the second computing element 74 using two super-speed lanes (block 310). If the answer to block 308 is no, the response indicates that the second computing element 74 is not capable of supporting two super-speed lanes, then the computing elements 72 and 74 operate in a legacy mode (block 312).

The techniques for increased data flow in USB cables according to aspects disclosed herein may be used in association with any processor-based device that includes a USB receptacle. Examples, without limitation, include a set top box, an entertainment unit, a navigation device, a communications device, a fixed location data unit, a mobile location data unit, a mobile phone, a cellular phone, a smart phone, a tablet, a phablet, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, and an automobile.

Figure 13:
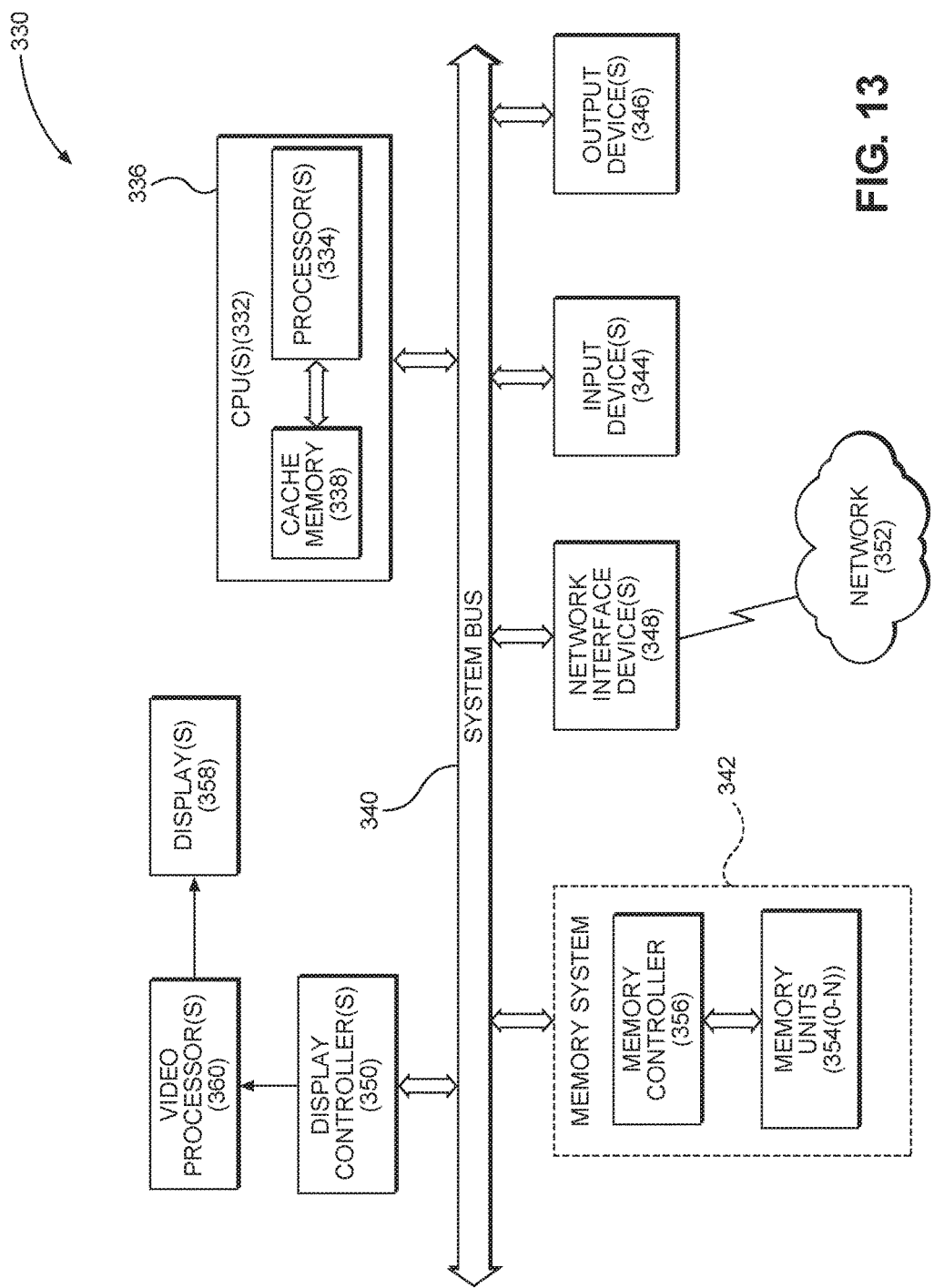
FIG. 13 is a block diagram of an exemplary processor-based system that can utilize the increased data flow over USB cable techniques described herein.

In this regard, FIG. 13 illustrates an example of a processor-based system 330 that may be considered a computing element such as the first computing element 72 illustrated in FIG. 4. It should be appreciated that the processor-based system 330 may be any of the other computing elements described herein. In this example, the processor-based system 330 includes one or more central processing units (CPUs) 332, each including one or more processors 334. The CPU(s) 332 may be a master device 336. The CPU(s) 332 may have cache memory 338 coupled to the processor(s) 334 for rapid access to temporarily stored data. The CPU(s) 332 is coupled to a system bus 340 and can intercouple master and slave devices included in the processor-based system 330. As is well known, the CPU(s) 332 communicates with these other devices by exchanging address, control, and data information over the system bus 340.

Other master and slave devices can be connected to the system bus 340. As illustrated in FIG. 13, these devices can include a memory system 342, one or more input devices 344, one or more output devices 346, one or more network interface devices 348, and one or more display controllers 350, as examples. The input device(s) 344 can include any type of input device, including, but not limited to, input keys, switches, voice processors, etc. The output device(s) 346 can include any type of output device, including, but not limited to, audio, video, other visual indicators, etc. While not illustrated, it should be appreciated that the system bus 340 may couple to a USB receptacle with an appropriate USB controller and PHY and through such USB receptacle couple to the input device(s) 344 and the output device(s) 346 through a USB cable. The network interface device(s) 348 can be any devices configured to allow exchange of data to and from a network 352. The network 352 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 348 can be configured to support any type of communications protocol desired. The memory system 342 can include one or more memory units 354 (0-N) and a memory controller 356.

The CPU(s) 332 may also be configured to access the display controller(s) 350 over the system bus 340 to control information sent to one or more displays 358. The display controller(s) 350 sends information to the display(s) 358 to be displayed via one or more video processors 360, which process the information to be displayed into a format suitable for the display(s) 358. The display(s) 358 can include any type of display, including, but not limited to, a cathode ray tube (CRT), a liquid crystal display (LCD), a plasma display, a light emitting diode (LED) display, etc.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. An element comprising:
   a Universal Serial Bus (USB)-type cable receptacle comprising a first set of pins and a second set of pins;
   a controller configured to concurrently:
   put a first USB super-speed TX signal on the first set of pins in the USB-type cable receptacle;
   receive a first USB super-speed RX signal on the first set of pins in the USB-type cable receptacle;
   put a second USB super-speed TX signal on the second set of pins in the USB-type cable receptacle; and
   receive a second USB super-speed RX signal on the second set of pins in the USB-type cable receptacle;

wherein the controller is configured to operate both USB super-speed TX signals and both USB super-speed RX signals absent a USB 2.0 signal passing through pins of the USB-type cable receptacle.

2. The element of claim 1, wherein the USB-type cable receptacle comprises a USB Type-C cable receptacle.

3. The element of claim 1, wherein the first set of pins comprises four pins.

4. The element of claim 3, wherein the second set of pins comprises four pins.

5. The element of claim 3, wherein the first set of pins comprises TX1+, TX1−, RX1+, and RX1− pins.

6. The element of claim 1, wherein the controller comprises a first sub-controller associated with the first set of pins and a second sub-controller associated with the second set of pins.

7. The element of claim 6, wherein the first sub-controller is configured to act as a USB host.

8. The element of claim 7, wherein the second sub-controller is configured to act as a USB host.

9. The element of claim 7, wherein the second sub-controller is configured to act as a USB device.

10. The element of claim 6, wherein the first sub-controller is configured to act as a USB device.

11. The element of claim 10, wherein the second sub-controller is configured to act as a USB device.

12. The element of claim 1, wherein the USB-type cable receptacle further comprises a third set of pins.

13. The element of claim 12, wherein the controller is configured to put video or audio signals on the third set of pins.

14. The element of claim 1 integrated into a device selected from the group consisting of: a set top box; an entertainment unit; a navigation device; a communications device; a fixed location data unit; a mobile location data unit; a mobile phone; a cellular phone; a smart phone; a tablet; a phablet; a computer; a portable computer; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; and an automobile.

15. A method of coupling two computing elements together comprising:
    detecting insertion of a Universal Serial Bus (USB)-type plug into a USB-type receptacle at a first computing element;
    initiating a capability inquiry over a USB-type cable associated with the USB-type plug; and
    if a response is received indicating that a second computing element is capable of supporting two concurrent super-speed lanes over the USB-type cable, communicating between the first computing element and the second computing element using the two concurrent super-speed lanes without passing a USB 2.0 signal over the USB-type cable;
    wherein each of the two concurrent super-speed lanes comprises concurrent RX and TX communications.

16. The method of claim 15, further comprising operating in a legacy mode if a response is received indicating that the second computing element is not capable of supporting the two concurrent super-speed lanes.

17. The method of claim 15, further comprising sending an audio or video signal over a D+/D− lane of the USB-type cable.

18. The method of claim 15, further comprising operating a first of the two concurrent super-speed lanes as a host and operating a second of the two concurrent super-speed lanes as a device.

19. A computing system comprising:
    a first element comprising a first Universal Serial Bus (USB)-type receptacle;
    a second element comprising a second USB-type receptacle; and
    a USB-type cable coupled at a first end to the first USB-type receptacle and coupled to the second USB-type receptacle at a second end;
    wherein the first element is configured to communicate with the second element using two super-speed lanes concurrently over the USB-type cable without passing a USB 2.0 signal over the USB-type cable; and
    wherein each of the two super-speed lanes comprises concurrent RX and TX communications.

* * * * *